(12) United States Patent  
Pedersen et al.

(10) Patent No.: US 7,428,814 B2  
(45) Date of Patent: Sep. 30, 2008

(54) TURBINE ASSEMBLIES AND RELATED SYSTEMS FOR USE WITH TURBOCHARGERS

(76) Inventors: Melvin Hess Pedersen, 161 E. 175 South, North Salt Lake, UT (US) 84054; Steven Ronald Benson, P.O. Box 57608, Salt Lake City, UT (US) 84157

( * ) Notice: Subject to any disclaimer, the term of this patent is extended or adjusted under 35 U.S.C. 154(b) by 48 days.

(21) Appl. No.: 11/371,679

(22) Filed: Mar. 8, 2006

(65) Prior Publication Data

US 2007/0209361 A1    Sep. 13, 2007

(51) Int. Cl.  
*F02D 23/00* (2006.01)

(52) U.S. Cl. .................. 60/602; 415/912; 415/202; 415/203; 415/204

(58) Field of Classification Search .............. 60/602; 415/202–204, 912, 165–167, 186, 187, 208.3, 415/211.1  
See application file for complete search history.

(56) References Cited

U.S. PATENT DOCUMENTS

| | | | | |
|---|---|---|---|---|
| 3,270,495 A * | 9/1966 | Connor | ..................... | 60/602 |
| 3,557,549 A * | 1/1971 | Webster | ..................... | 60/602 |
| 4,389,845 A * | 6/1983 | Koike | ..................... | 60/602 |
| 4,512,714 A * | 4/1985 | Kaesser | ..................... | 415/151 |
| 4,544,326 A * | 10/1985 | Nishiguchi et al. | ..................... | 415/151 |
| 4,781,528 A * | 11/1988 | Hagita et al. | ..................... | 415/151 |
| 4,809,509 A * | 3/1989 | Hohkita | ..................... | 60/605.1 |
| 5,092,126 A * | 3/1992 | Yano | ..................... | 60/602 |
| 5,372,485 A * | 12/1994 | Sumser et al. | ..................... | 417/407 |
| 5,454,225 A * | 10/1995 | Sumser et al. | ..................... | 60/602 |
| 5,758,500 A * | 6/1998 | Sumser et al. | ..................... | 60/602 |
| 6,089,019 A * | 7/2000 | Roby et al. | ..................... | 60/605.2 |
| 6,263,672 B1 * | 7/2001 | Roby et al. | ..................... | 60/605.2 |
| 6,669,441 B2 * | 12/2003 | Bertnik et al. | ..................... | 415/158 |
| 6,672,061 B2 * | 1/2004 | Schmid et al. | ..................... | 60/605.2 |
| 6,941,755 B2 * | 9/2005 | Bucknell et al. | ..................... | 60/602 |
| 7,269,950 B2 * | 9/2007 | Pedersen et al. | ..................... | 60/602 |
| 2005/0086936 A1 * | 4/2005 | Bucknell et al. | ..................... | 60/602 |
| 2006/0042247 A1 * | 3/2006 | Haugen | ..................... | 60/612 |

* cited by examiner

*Primary Examiner*—Thomas Denion  
*Assistant Examiner*—Douglas J. Duff  
(74) *Attorney, Agent, or Firm*—Thorpe North & Western LLP

(57) ABSTRACT

A turbocharger turbine housing with at least two volutes utilizing multiple nozzle rings to optimize the turbocharger's proficiency per application, and a valve to control the exhaust flow to selected volutes in the turbine housing.

18 Claims, 19 Drawing Sheets

TURBINE ASSEMBLIES AND RELATED SYSTEMS FOR USE WITH TURBOCHARGERS

BACKGROUND

1. The Field of the Invention

This invention relates to internal combustion engines and more particularly, to novel systems and methods for forced-air induction systems.

2. The Background Art

It is often desirable to increase the power output of an internal combustion engine through the use of a turbocharger. Turbocharger systems and methods have been used successfully in many applications for many years.

The turbine wheel of a turbocharger is encompassed by a scroll or volute. The volute acts as a chamber, conduit, and nozzle to direct the flow of exhaust gases, from an internal combustion engine, toward the blades of the turbine wheel to induce rotation. The shaft of the turbine wheel is connected to a compressor wheel that will induce high-pressure air into the intake of the engine as the compressor wheel is rotated. Different volutes are designed for different volumetric flow rates of exhaust gases. The volumetric flow rate of exhaust gases is a function of engine speed. Thus turbocharger turbines operate at optimal levels only within a specific range of engine speeds. On either side of that specific range, the performance of the turbocharger degrades.

Many turbochargers, with multiple volute housings, have included different types of valves and director plates that direct the exhaust gases into specific volutes within the turbocharger housing. At low engine output, this director valve will close off one or more of the volute passages and allow the gases to pass into only one of the smaller volutes. Whereas these valves maintain or increase the velocity of the gases within the volute portion of the housing, they loose a high percentage of the available power as the gases are induced into the annular nozzle of the housing. This loss of velocity occurs as the high-speed exhaust gases are being thrust into the stagnant gases contained in the nozzle opening of the volute that is closed off by the director valve. Without a direct barrier between the two gas chambers this becomes a direct parasitic load on the turbine wheel.

This problem is always present in any turbocharger system containing a director valve and a multi-volute turbocharger housing, because both volute chambers share the same annular nozzle. If the dividing wall between the volutes is extended into the annular nozzle, a wide and turbulent interface boundary is created within the closed volute around the periphery of the turbine wheel. In this opening the high-speed exhaust gases that are immediately encompassing the turbine wheel are colliding with the stagnant gases within the closed off volute. This significantly reduces the impingement velocity of the drive gases against the turbine wheel.

Nozzle rings with fixed directing vanes have been used in turbocharger housings to direct exhaust gases within the annular nozzle of the housing. These nozzle rings have also been used to change the annular nozzle opening to adjust for engine load and speed. There have also been housings utilizing nozzle rings with moveable vanes to adjust for engine load and rotational velocity. These devices are bulky, relatively expensive, and require many moving parts. These moving parts have significant maintenance issues because of the harsh operating environment within the turbocharger housing. This harsh environment is the combined effect of extremely high temperatures and soot, mixed with other abrasive material contained in exhaust gases that are forced through the housing at super-sonic speeds.

What is needed is a device to channel the exhaust gases against the turbine wheel while creating a solid boundary between the high-speed gases used to drive the turbine wheel and the stagnant gases of a closed volute section. In addition to those requirements, the device must be able to adjust for different engine loads without having serious maintenance problems.

BRIEF SUMMARY OF THE INVENTION

Certain embodiments in accordance with the present invention may provide a turbocharger, comprising a housing, a turbine wheel, a compressor, an exhaust gas director device, and fixed-vane nozzle rings. The turbine may include at least one turbine wheel surrounded by at least two volute gas chambers. The volute gas chambers may be symmetrically or asymmetrically arranged to direct exhaust gases supplied thereto into the fixed-vane nozzle rings. The vanes of the multiple nozzle rings direct and converge the exhaust gases toward the turbine wheel to cause rotation. Rotation of the turbine wheel may, in turn, cause the rotation of the compressor.

The director device may be positioned upstream from the turbine to control distribution of the exhaust gases between the volute gas chambers. By varying which volute gas chamber (or combination of volute gas chambers) receives exhaust gases, a director may control the volumetric flow of gases in each specific volute gas chamber.

The fixed-vane nozzle rings are mounted between the annular openings of the volute gas chambers and the turbine wheel. The nozzle rings may be concentrically oriented around the turbine wheel. Each volute may have a corresponding nozzle ring. As the exhaust gases are forced from each volute into the corresponding nozzle ring, the exhaust gases are directed toward the turbine wheel by the vanes on the nozzle rings. The nozzle rings form a solid barrier that isolates the high-speed gases from the stagnant gases within the scrolls that are closed off by the director valve.

Each one of the multiple nozzle rings may control the opening of the annular nozzle within each corresponding volute, and thus control the back pressure in the exhaust conduit. By utilizing different amplitude of airfoils on the vanes, and different incident angles relative to the turbine wheel, the nozzle rings may control the impingement velocity of the exhaust gases. Thus, through the use of multiple stacked nozzle rings, each separate volute may be suited to a specific level of proficiency.

For low volumetric flows of exhaust gases (low engine RPM), the director may increase the impingement velocity to near an optimal level by directing the flow of exhaust gases into a volute gas chamber with a nozzle ring having a comparatively small opening and a low incident angle. For higher volumetric flows of exhaust gases (higher engine RPM), the director valve may decrease the back pressure in the exhaust conduit by directing the gases into a volute with a nozzle ring having a comparatively large opening and a higher incidence angle.

In certain embodiments the fixed vanes, and the solid web between the vanes of each nozzle ring, may be contoured to control and direct the exhaust gases. This contouring may be to increase the proficiency of the turbocharger or just to decrease the back pressure in the exhaust conduit.

In practical application, multiple nozzle rings can suit an engine to a specific task. For example: Two trucks may have identical engines, but be built for different types of service. One may have a low-geared drive train for pulling a heavy trailer over mountainous terrain. This application would require the engine to work hard at elevated RPM. The other truck may have a high-geared drive train and be used in light delivery work on smooth highways. This application would require the turbocharger to maintain moderate intake boost levels with low exhaust volumes. Even though both trucks may have identical engines, through the use of interchangeable multiple nozzle rings, the turbocharger may be suited to run at optimal levels for each application. Also, multiple nozzle rings can be used on identical turbochargers to operate at optimal levels on engines with dissimilar displacements.

BRIEF DESCRIPTION OF THE DRAWINGS

The features of the present invention will become more apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 22 shows a nozzle ring assembly of three sets of vanes formed in one piece.

FIG. 23 shows a nozzle ring assembly utilizing three separate rings.

FIG. 24 shows an assembly of two sets of vanes mounted on opposite sides of one ring and one separate nozzle ring.

FIG. 25 shows two nozzle rings formed in one piece with contoured leading and trailing edges and a contoured web.

Figure 1:
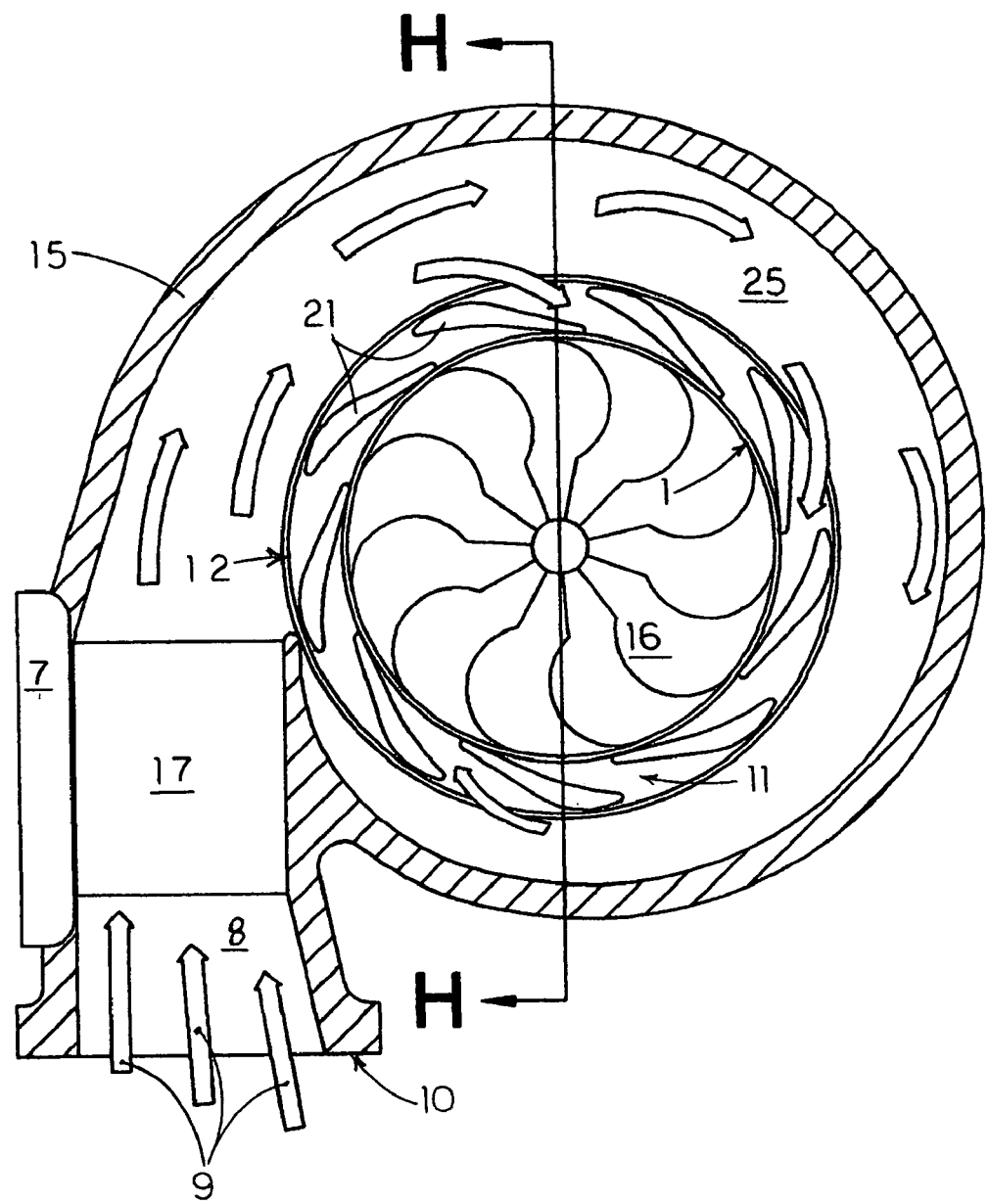
FIG. 1 is a top, cross-sectional view of a turbine housing in accordance with the present invention.

The following is a list of numerical designations with accompanying nomenclature of each part.

1. Annular nozzle or Annulus
2. Bearing housing
3. Clamping ring
4. Contoured web surface
5. Contoured vane leading edge
6. Contoured vane trailing edge
7. Cover Plate
8. Exhaust conduit
9. Exhaust gases (with arrows showing flow)
10. Flange
11. Gas passage between vanes
12. Nozzle ring
13. Pitch Angle
14. Retainer ring
15. Turbine housing
16. Turbine wheel
17. Valve
18. Valve Director Surface
19. Valve Housing
20. Valve Sealing Surface
21. Vane
22. Vane leading edge
23. Vane trailing edge
24. Volute dividing wall
25. Volute gas chamber
26. Web
27. Wedge gate

DETAILED DESCRIPTION

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 26 is not intended to limit the scope of the invention, as claimed, but is merely representative of selected embodiments of the invention. The exemplary embodiments of the invention will be best understood by reference to the drawings, wherein like parts are designated by the numerals throughout.

Referring to FIG. 1, the exhaust conduit 8 may be applied to an internal combustion engine and connected to a turbine housing 15 of a turbocharger. An internal combustion engine may have more than one exhaust conduit 8 and more than one turbine housing 15.

The Turbine housing 15 may enclose an exhaust conduit 8, more than one volute gas chamber 25, at least one nozzle ring 12, at least one annular nozzle 1, and at least one turbine wheel 16. The turbine housing 15 may also have a valve 17 enclosed within the turbine housing 15. Section H-H is a cross-sectional view and is shown in FIG. 2.

As the exhaust gases 9 are expelled from the internal combustion engine, they are forced into the exhaust conduit 8. A valve 17 then controls the flow of the exhaust gases 9. This may be any type of valve that will control the flow of the exhaust gases 9 into each of the at least two volute gas chambers 25. After exhaust gases 9 are forced through the valve 17 they enter at least one of the volute gas chambers 25. The volute gas chambers 25 may be a scroll shaped chamber that reduces in cross-sectional area as it is formed around the outside periphery of the nozzle ring 12. At least one nozzle ring 12 receives the exhaust gases 9. The vanes 21 on the nozzle ring 12 converge and direct the exhaust gases 9 against the blades of the turbine wheel 16.

Figure 2:
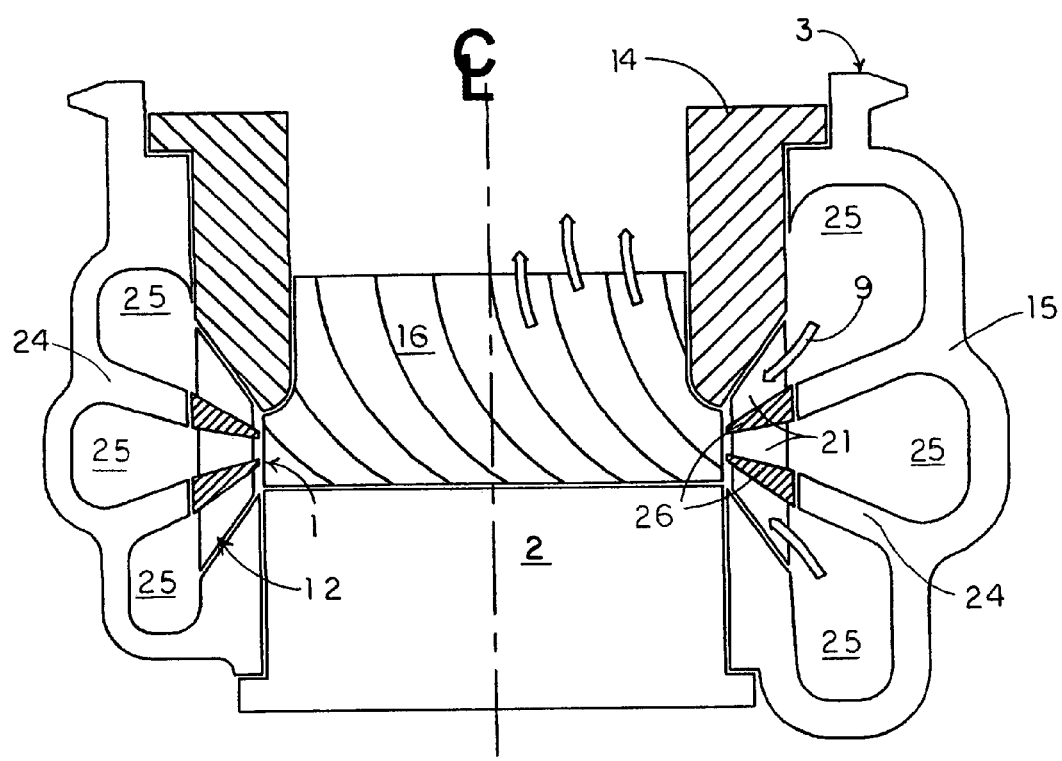
FIG. 2 is the side cross-sectional view of the turbine housing in FIG. 1, marked section H-H. The Flange and other ancillary items past the centerline are not shown in this view.

Referring to FIG. 2, a turbine housing 15 will enclose at least two volute gas chambers 25 in accordance with the new invention. FIG. 2 is the cross-sectional view marked on FIG. 1 as section H-H. The volute gas chambers 25 are divided by volute dividing walls 24. Each volute gas chamber 25 may have a nozzle ring 12 on the inside opening of the volute gas chamber 25. Each set of nozzle ring vanes 21 may be divided by divider wall or web 26. These at least one nozzle rings 12 are held in place by a retainer ring 14. The retainer ring 14 may be any part of the turbine housing 15. The turbine housing 15 may be formed in more than one piece to make the nozzle rings 12 accessible and hold them in a fixed position. The turbine housing 15 may be designed to replace the nozzle rings 12 from any side. This may be by removing one or more parts of the turbine housing 15, or the exhaust pipe connection (not shown), the bearing housing 2, or any combination of the above. The turbine wheel 16 is mounted on a shaft (not shown) that is rotationally disposed in the bearing housing 2.

The exhaust gases 9 flow from the volute gas chambers into the space between the vanes 21 of the nozzle ring 12. The nozzle rings 12 form an annular nozzle 1 that will direct the exhaust gases 9 against the turbine wheel 16. The exhaust gases are then passed through the turbine wheel 16 and expelled into the atmosphere or into other exhaust emission control mechanism (not shown). This outside exhaust conduit (not shown) may be connected by the clamping ring 3 or by other fastening methods.

Each volute gas chamber 25 contains exhaust gases 9 that may be stagnant or flowing. These gases are controlled by the valve 17. Thus, the flow of exhaust gases 9, and the resultant impingement velocity of the exhaust gases 9 against the turbine wheel 16 are controlled by the valve 17 and the nozzle rings 12. Each volute gas chamber 25 may be controlled in such a manner to adjust the proficiency of each volute gas chamber 25 to suit a specific function. This may be to bring the individual volute gas chamber 25 to maximum performance or to expel excess exhaust gases to reduce exhaust back pressure on the engine. By adjusting the exhaust gases 9 and the opening through the nozzle rings 12, an engine may be adjusted or tuned to maximum proficiency throughout the working range of the engine, or to suit an engine to a specific task. This method may also suit a turbocharger to fit a specific engine or may be used to fit a specific turbocharger to several different engines or requirements.

Although FIG. 2 shows a turbine housing 15 with three volute gas chambers 25, any number of volute gas chambers 25, two or more may be used in accordance with the present invention. Each volute gas chamber 25 may be fitted with an individual set of nozzle vanes 21 or may have one set of nozzle vanes 21 fit over the openings in two or more volute gas chambers 25. A turbine housing 15 may have one volute gas chamber that may also form its own annular nozzle 1 without having a nozzle ring 12 fit into that particular volute, and still have one or more other volute gas chambers 25 with nozzle rings 12 forming the annular nozzle.

The turbine housing 15 may also have the vanes 21 for the nozzle rings 12 cast into the housing or formed as part of the housing. These vanes 21 may also be cast or formed into one or more of the volute gas chambers 25 and still have one or more of the volute gas chambers 25 remain open forming its own annular nozzle 1 without having vanes 21 cast or formed into that particular volute.

The nozzle rings may be keyed into position by a keyway, a protrusion or recess in the nozzle ring, or by any acceptable fastening method. The purposes for this keyed positioning may be to prevent the nozzle ring 12 from rotating, or to match the elements of another nozzle ring 12, for example, the vane trailing edges 23.

The turbine housing 15 may be cast or formed of high temperature metal alloys, formed of ceramic material, or manufactured in any manner to retain structural integrity at elevated temperatures.

Figure 3:
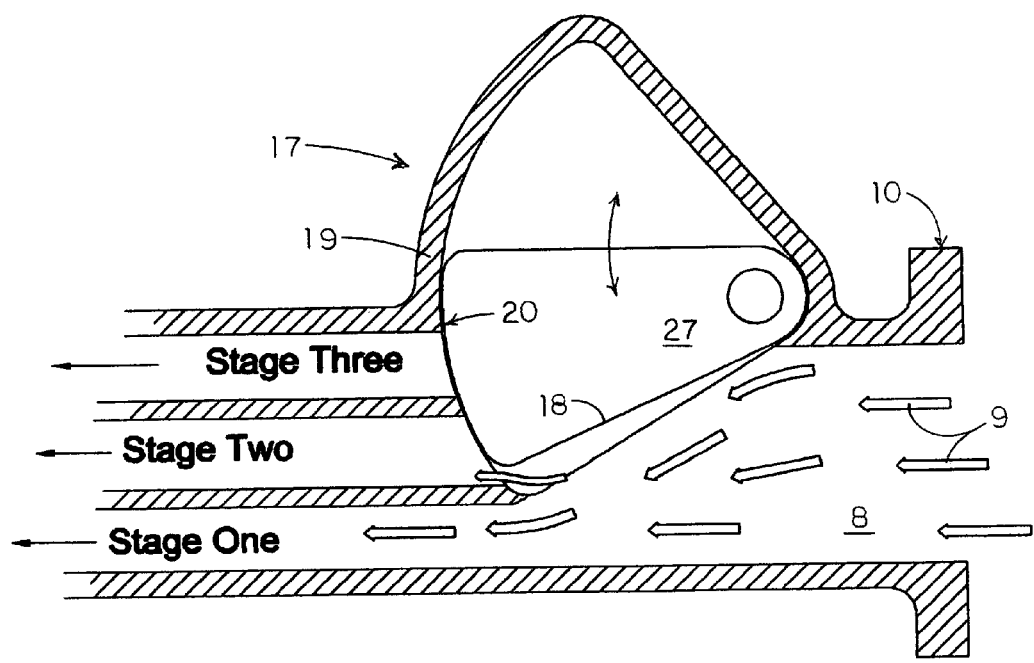
FIG. 3 is a side cross-sectional view of one embodiment of a director valve controlling the gases being expelled into the turbine housing.

Referring to FIG. 3, a valve 17 in accordance with the present invention may be operatively positioned in the exhaust conduit 8. This valve 17 may be of any type or design that will effectively control the flow of exhaust gases 9 into one or more of the volute gas chambers 25 or to other desired locations. The valve housing 19 may enclose a gate 27 with a sealing surface 20 to open and close the ports to the volute gas chambers 25 and a valve directing surface 18 for directing exhaust gases 9. The valve 17 may be operated by any effective method. These methods may include any number of sensors and operators including but not limited to, exhaust back pressure or intake boost pressure systems, mechanical or electrical operators, springs, or hydraulic actuators. The specific sensors and actuators may be chosen to fit each separate application.

The function of the valve is to control or to block the exhaust gases 9 flowing into the volute gas chambers 25. At low exhaust volumes, when the engine is at low RPM, the valve 17 may allow exhaust gases 9 to flow into only one small volute gas chamber 25 that may be fitted with a nozzle ring 12 with a high pitch. This would increase the drive pressure and the impingement velocity of the exhaust gases 9 against the turbine wheel 16. This is illustrated as stage one. This may be desirable at start up. As the engine increases in speed and produces a higher volume of exhaust gases 9, the valve 17 may open to allow the exhaust gases 9 to flow into another volute gas chamber 25 that may be fitted with a nozzle ring with a lower pitch. This would maintain adequate drive pressure against the turbine wheel 16 without creating excessive back pressure in the exhaust conduit 8. This may be good for an engine with elevated RPM. This is illustrated as stage two. In case an engine is under a heavy workload, and may be producing large exhaust gas volumes, then the valve 17 may open up a third port. This port may lead to a third volute gas chamber that may be fitted with a nozzle ring having a very low pitch, or to an opening to bypass the exhaust gases 9 around the turbine wheel 16. This is illustrated as stage three.

In our preferred embodiment, the valve 17 comprises a housing 19 that encloses a gate with both a valve sealing surface 20 and a valve director surface 18 formed in one piece. The valve directing surface 18 is effectually a moving section of the conduit wall. The housing 19 may begin to taper the cross-sectional area of the exhaust conduit 8. The valve directing surface 18 may continue this cross-sectional area reduction through the valve. Thus, at low exhaust gas volume this valve 17 will converge and direct the exhaust gases 9 into the desired volute gas chamber 25. At higher exhaust gas volumes the valve-directing surface 18 will move to allow more exhaust gases to pass into the volute gas chambers 25. As this valve directing surface 18 opens, the valve sealing surface 20 also moves to expose the opening to another volute gas chamber 25. This valve directing surface 18 may have any number of variable positions.

The redirection of the exhaust gases 9 caused by the valve directing surface 18 is a direct change in linear motion. Some types of valves require a larger section or an appendage to the exhaust conduit in order to function. Larger cross-sectional areas create chambers that diverge and reduce the velocity of the exhaust gases. Also, many types of valves redirect exhaust gases by creating an obstruction and forcing the exhaust gases to flow around the obstruction.

The redirection of exhaust gases by the valve directing surface 18 in accordance with the present invention is a primary redirection, not a collateral redirection. These redirections may be less than sixty (60) degrees throughout the entire operating range of the valve, without creating an obstruction to the flow in any part of the exhaust conduit. Also, the exhaust gases 9 are retained within a primary conduit which may continue to reduce in cross-sectional area throughout substantially the operating range of the valve 17.

The valve housing 19 may be formed or cast as part of the turbine housing 15. The valve housing 19 is enclosed with a cover plate 7.

Figure 4:
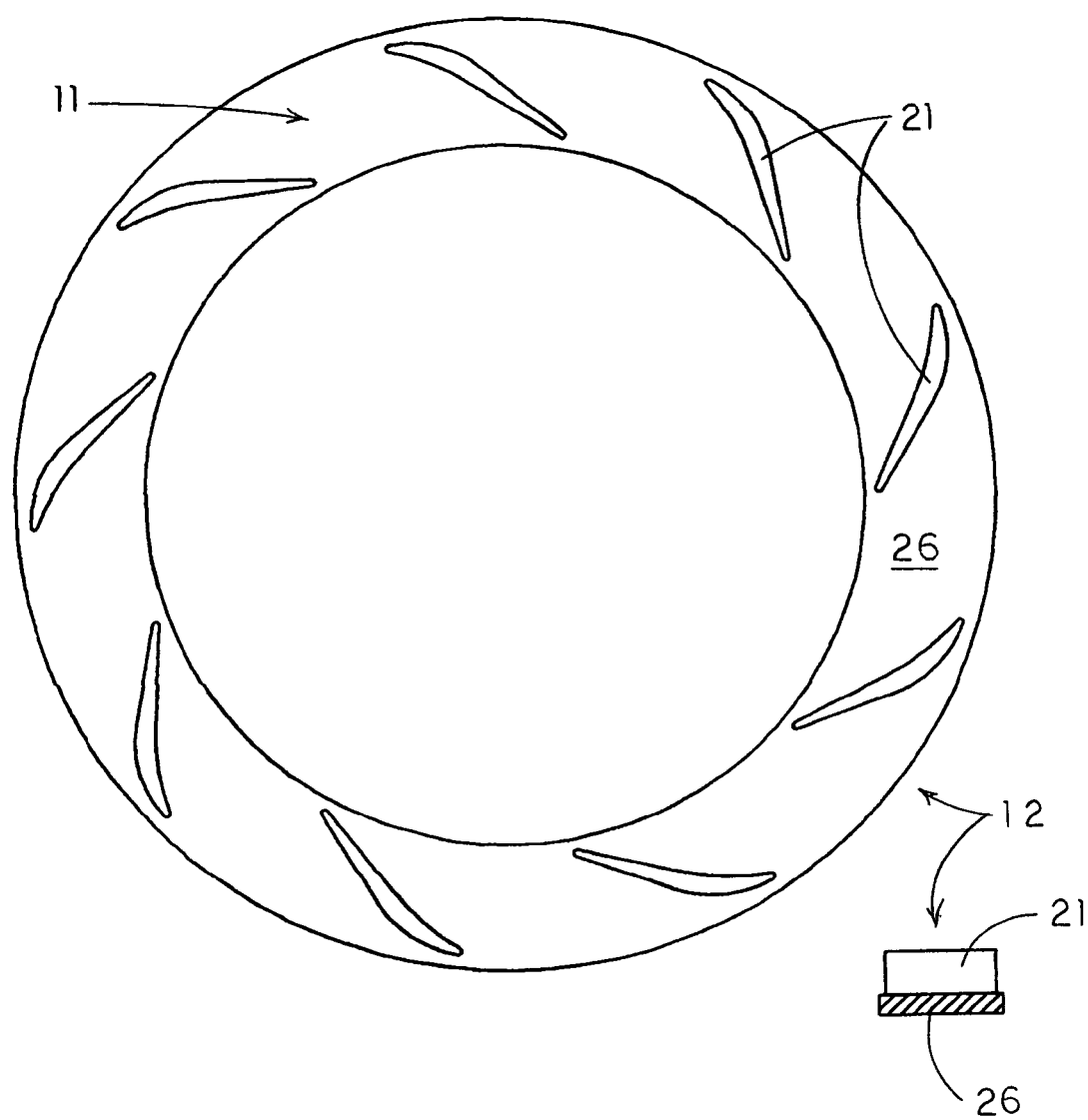
FIG. 4 is a top view of a standard nozzle ring with a typical cross-sectional view below (prior art).

Referring to FIG. 4: This is a top view of a standard nozzle ring in accordance with prior art and is explained herein only for the purpose of understanding the function of a nozzle ring. The vanes 21 are positioned in a polar array and are connected and mounted to a solid ring or web 26. The surface on the web 21 is generally flat and parallel with the top of the vanes 21. Section T-T is a cross-sectional view of the nozzle ring above. The web 26 extends past the vanes 21 on both the inside and outside periphery of the web 21. The vanes 21 are generally formed with side structures that are basically perpendicular to the web 26, with the exception of the foundry draft angle.

Figure 5:
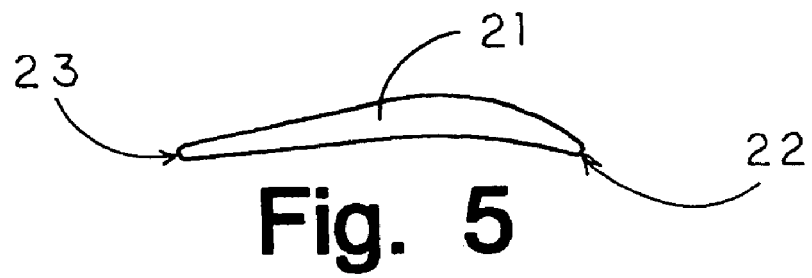
FIG. 5 is a top view of a nozzle ring vane with one concave side and one convex side.

FIG. 5 is a top view of a nozzle ring vane having an airfoil with one side concave and one side convex. Any shape that will allow gases to flow and/or direct the gases toward the turbine wheel is acceptable This shape on multiple or stacked nozzle rings will direct the flow of gases without loss of velocity or momentum. This is the basic shape of the vanes in our preferred embodiment.

The edges of the vanes 21 are a functional part of the vane. The edges that receive the exhaust gases 9 from the volute gas chamber 25 are the vane leading edges 22. The edges of the vanes that direct the gases at the turbine wheel 16 are the vane trailing edges 23. These edges may be contoured by slanting the edge, by forming it into a curve, by forming it at an angle, or any combination of the above. The contouring of these edges may help in controlling the impingement velocity of the exhaust gases 9 against the turbine wheel 16.

Figure 6:
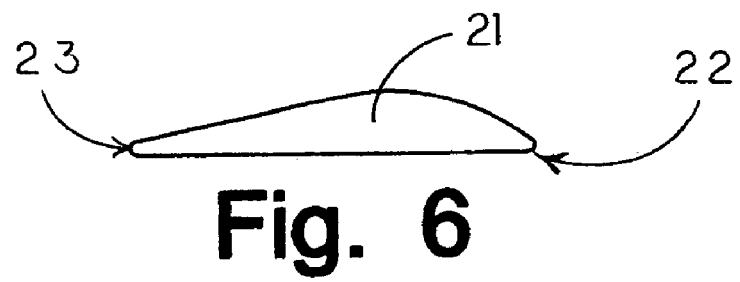
FIG. 6 is a top view of a nozzle ring vane with one convex side and one straight side.

FIG. 6 is a top view of a nozzle ring vane utilizing one flat side and a convex airfoil on the other side. These sides and edges may also be contoured as the vane 21 in FIG. 5.

Figure 7:
FIG. 7 is a top view of a nozzle ring vane with two convex sides.

FIG. 7 is a top view of a nozzle ring vane utilizing a convex airfoil on both sides. These sides and edges may also be contoured as the vane 21 illustrated in FIG. 5.

Figure 8:
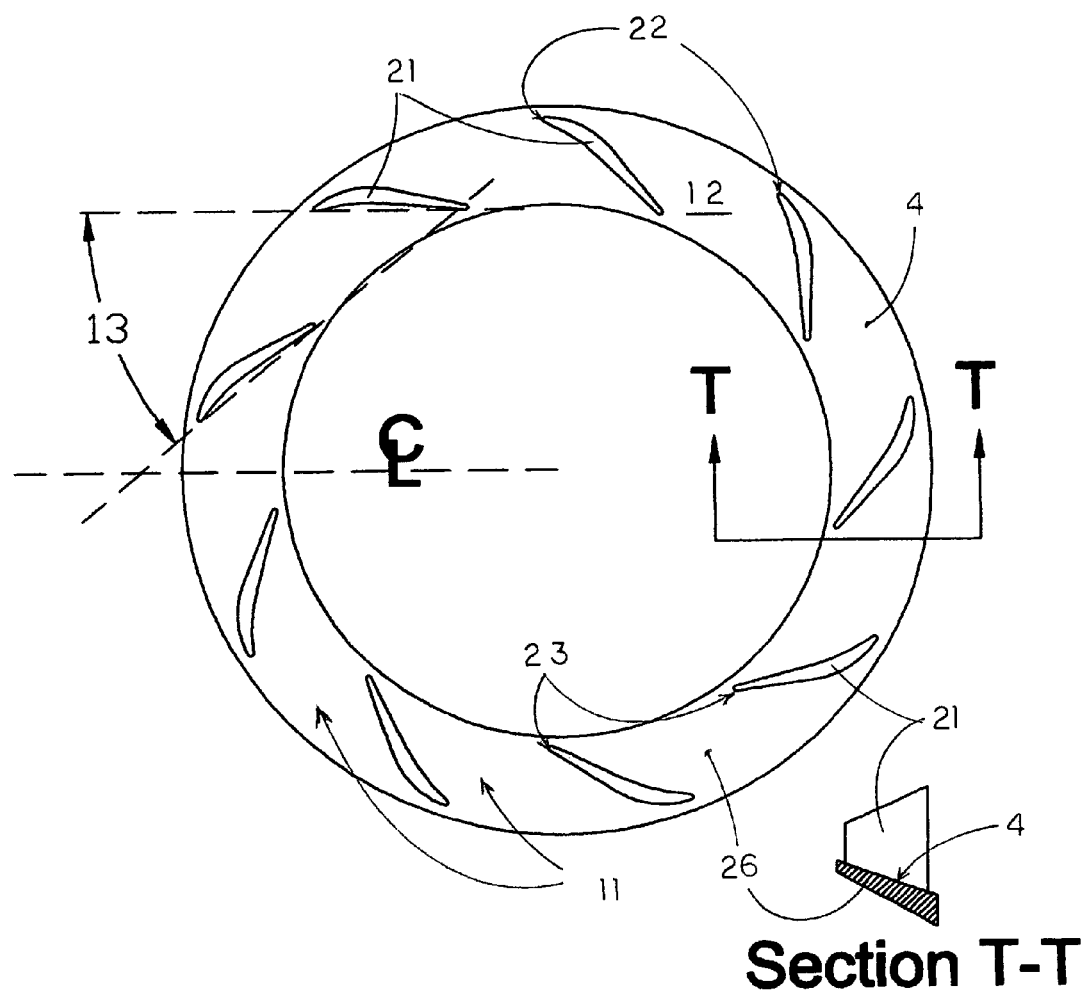
FIG. 8 is a top view of a nozzle ring in accordance with the present invention. Below is a cross-sectional view of the nozzle ring.

FIG. 8 is a top view of a single nozzle ring 12 in accordance with the new invention. The vanes are arranged in a polar array and are connected by and mounted to a web 26. These vanes 21 are spaced far apart with a large pitch angle 13 between the vanes 21. The cross-sectional view S-S below shows the contouring of the top of the vanes 21 and the contouring of the web surface 27.

The pitch angle 13 can be adjusted by using nozzle rings with a different amplitude (or thickness) of the vanes 21 and/or a nozzle ring with a different number of vanes 21. The pitch angle 13 is also a function of the impingement angle in relationship to the turbine wheel 16.

Thus the total pitch of the nozzle ring is a function of the pitch angle 13 and the volumetric space between the vanes 21. If the nozzle ring 12 has wide spaces between the vanes 21, and the vanes 21 are fixed at a low angle in relationship to the turbine wheel 16, then the nozzle ring 12 will allow exhaust gases 9 to flow through freely. A nozzle ring with these features is said to have a low pitch. A nozzle ring with many vanes 21 and the vanes 21 are fixed with a sharp pitch angle 13 will restrict the flow of exhaust gases 9. This will cause the exhaust gases 9 to converge and therefore increase the impingement velocity of the exhaust gases 9 against the turbine wheel 16. One of the side effects of this is that it may increase the exhaust back pressure in the exhaust conduit 8.

The web surface 27 may also be contoured to increase the drive pressure of the exhaust gases 9 against the turbine wheel 16. This contouring may be any shape to suit the specific purpose of the volute gas chamber 25 expelling exhaust gases 9 through the nozzle ring 12. Thus each nozzle ring 12 can be sized with the correct pitch and contour to suit the individual purpose of any volute gas chamber 25. The web surface 27 may also be contoured to "nest" against the nozzle ring 12 that may be pressed against it in a multiple nozzle ring assembly.

Figure 9:
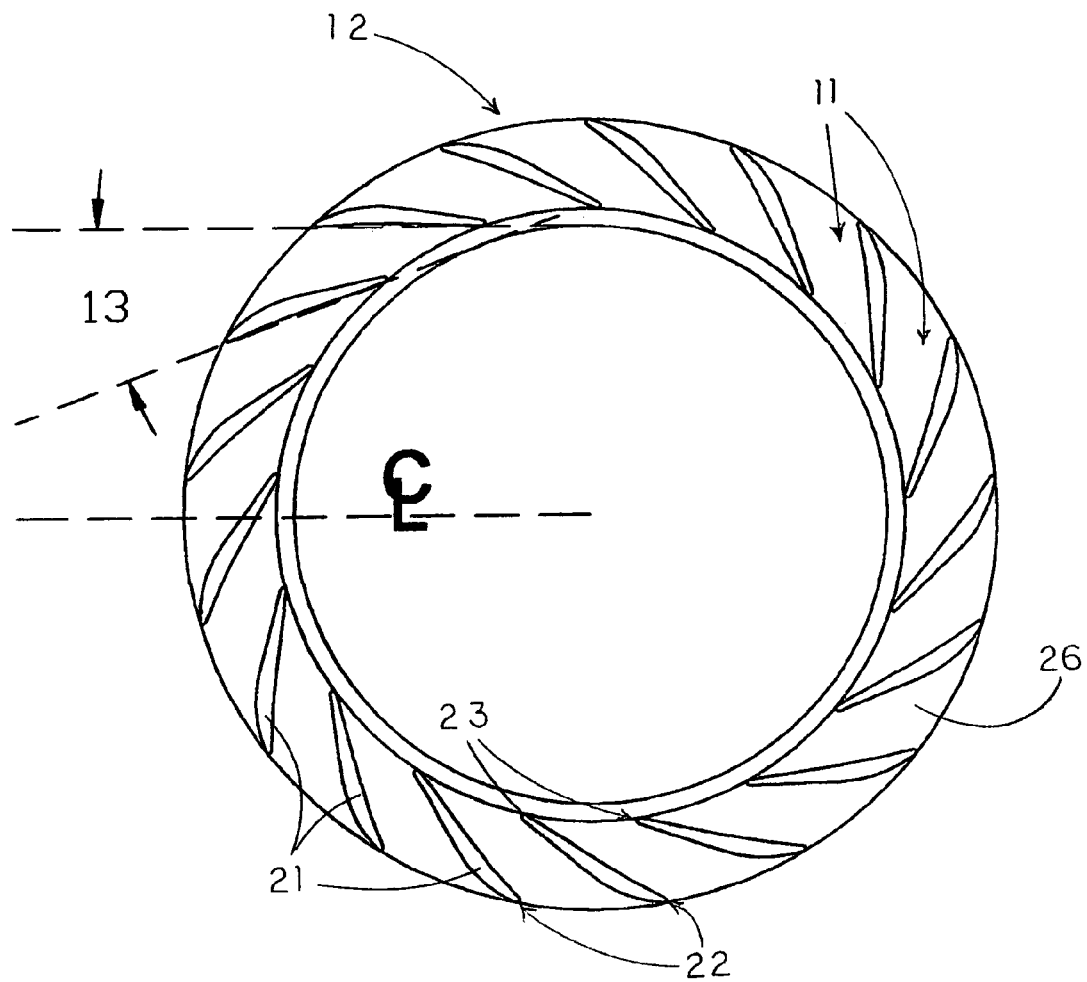
FIG. 9 is a top view of a nozzle ring in accordance with the present invention.

Referring to FIG. 9: This is a top view of a nozzle ring 12 with a high pitch rating. Note the sharp pitch angle 13 and the narrow channels between the vanes 21. This type of a nozzle ring would create back pressure in the exhaust conduit 8 and converge the gases between the vanes 21. However, the drive pressure against the turbine wheel 16 would be increased.

Figure 10:
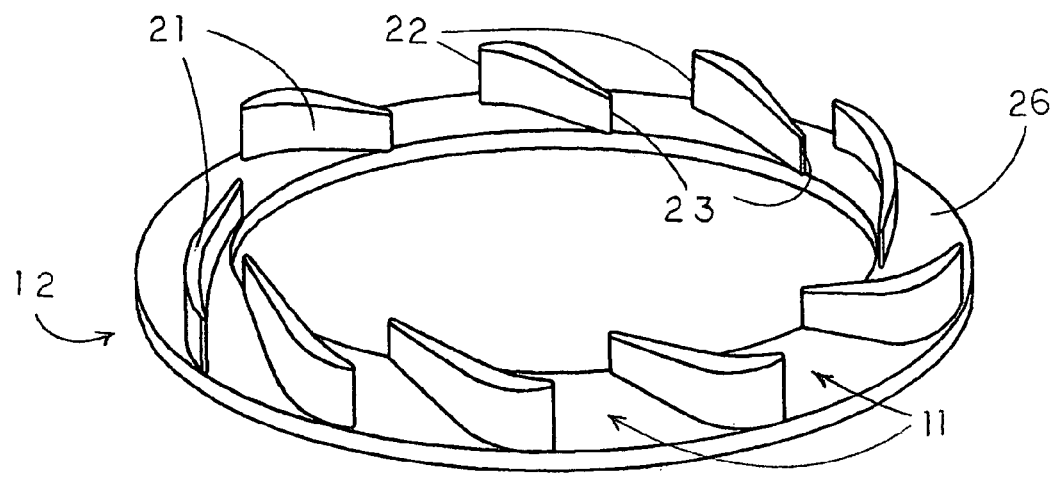
FIG. 10 is an isometric view of a single nozzle ring.

FIG. 10 show an isometric view of a single nozzle ring 12 in accordance with the present invention.

Figure 11:
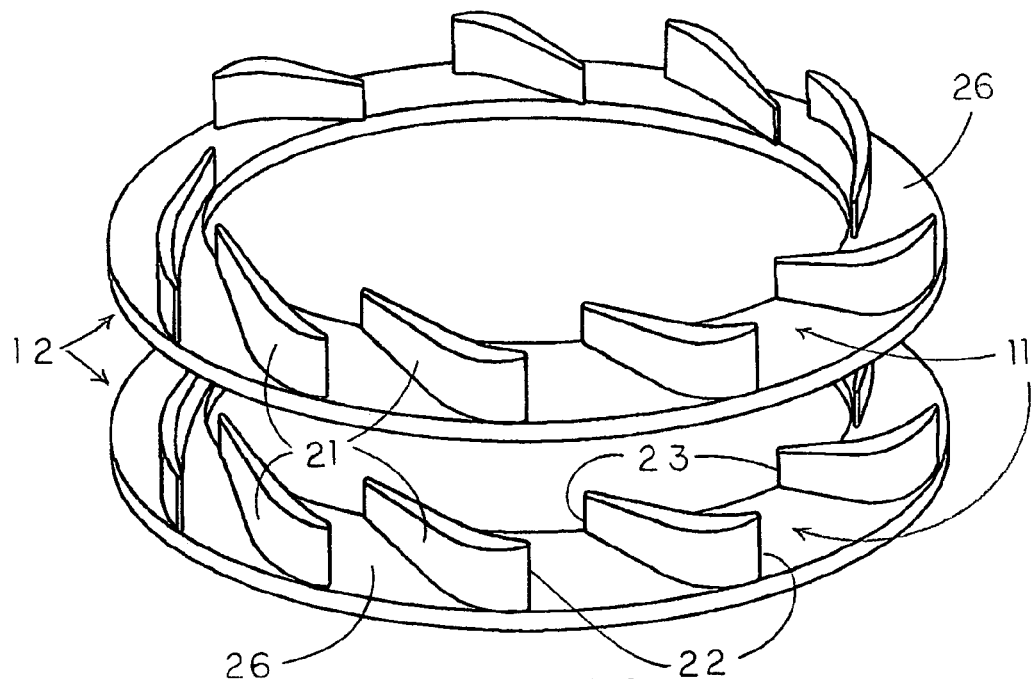
FIG. 11 is an isometric view of two separate nozzle rings being stacked on top of each other.

FIG. 11 is an isometric view of two individual nozzle rings 12 in accordance with the present invention. These nozzle rings 12 are in position to be stacked onto each other. The nozzle rings 12 may have the same pitch or each nozzle ring 12 may have a totally different pitch from the other nozzle ring 12.

Figure 12:
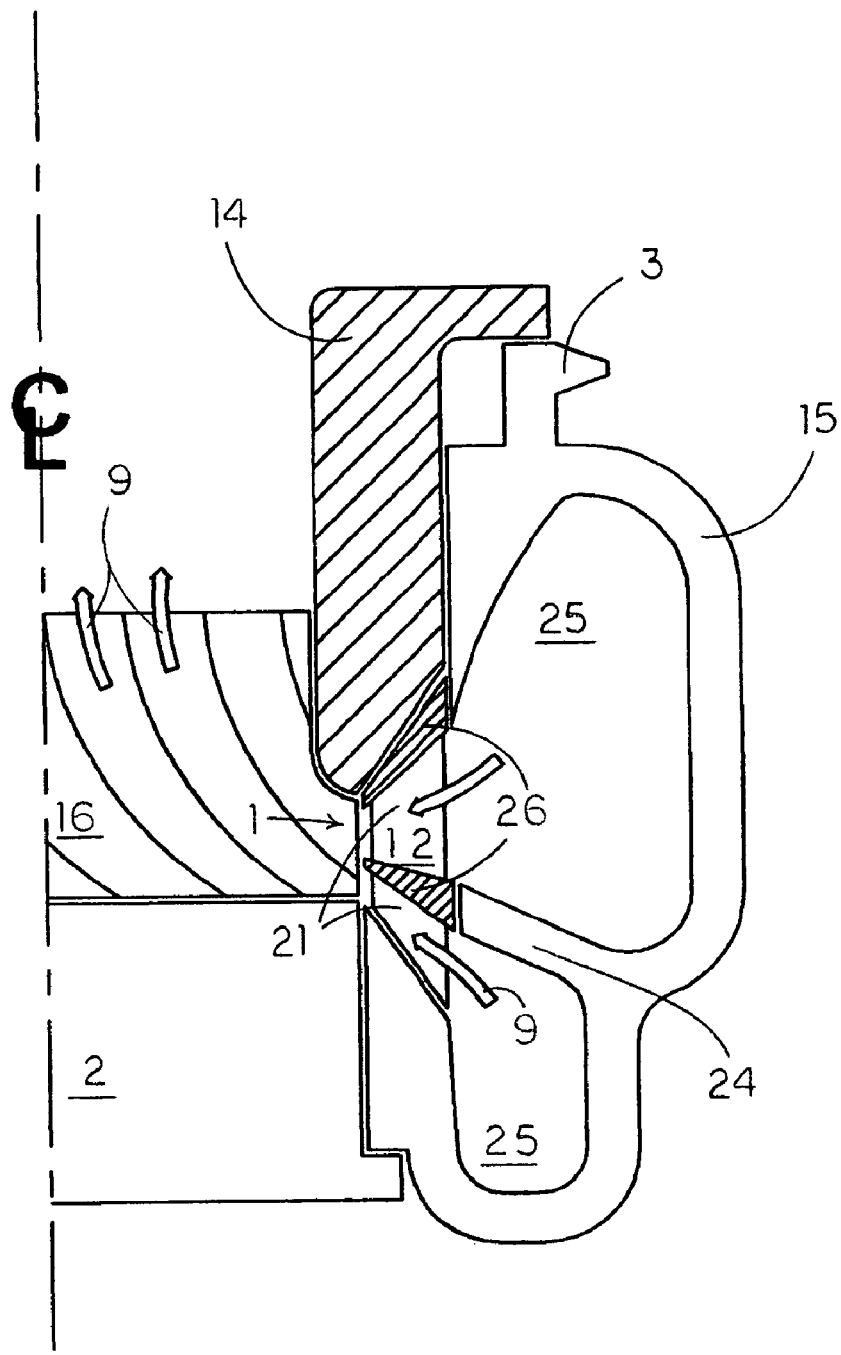
FIG. 12 is a partial cross-sectional view of a turbine housing with two volutes and two sets of nozzle ring vanes in accordance with the present invention.

FIG. 12 is a cross-sectional view of part of a turbine housing 15. Two nozzle rings 12 have been positioned inside the turbine housing 15 and are held in place by a retainer ring 14. In this case the retainer ring 14 is extended beyond the turbine housing 15 and may be held in place by the exhaust fitting that will be clamped in place with a band clamp around the clamping ring 3. The retainer ring may also be bolted into position.

The exhaust gases 9 are expelled from the volute gas chambers 25, through the channel between the vanes 21 of the nozzle ring 12, and forced against the turbine wheel 16.

Figure 13:
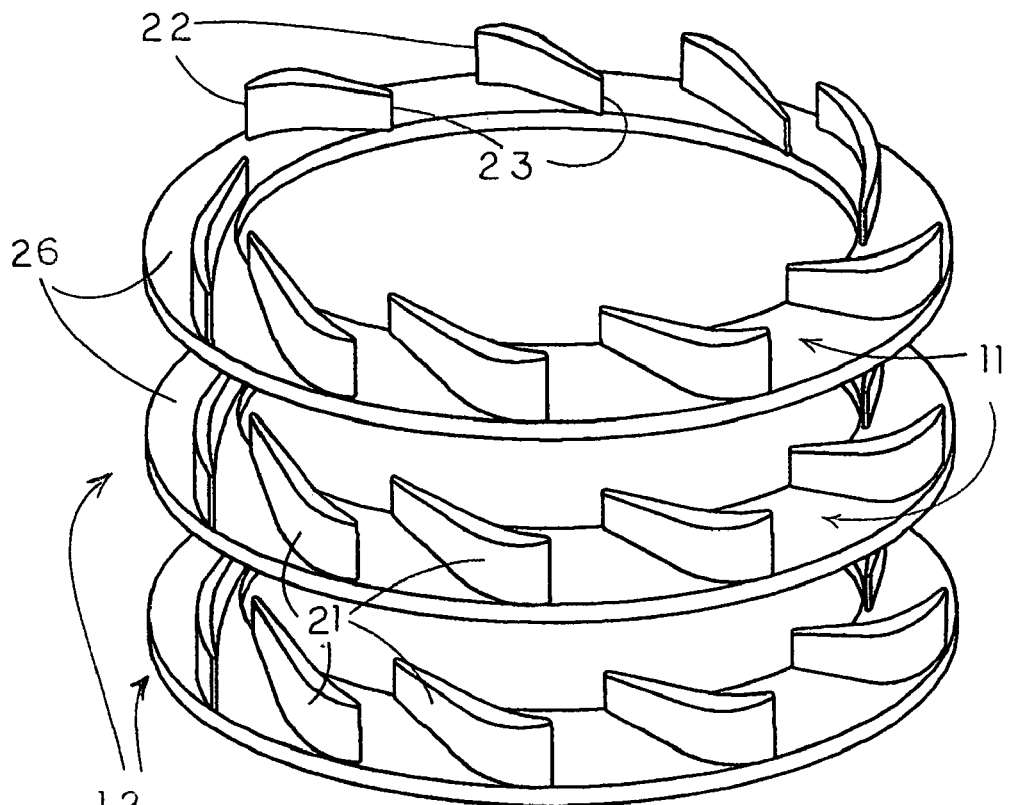
FIG. 13 is an isometric view of three separate nozzle rings.

FIG. 13 is an isometric view showing three individual nozzle rings ready to be stacked on top of one another. These may all be the same pitch or each may have a different pitch. The orientation of the vanes 21 may also be the same on each nozzle ring 12 or completely different.

Figure 14:
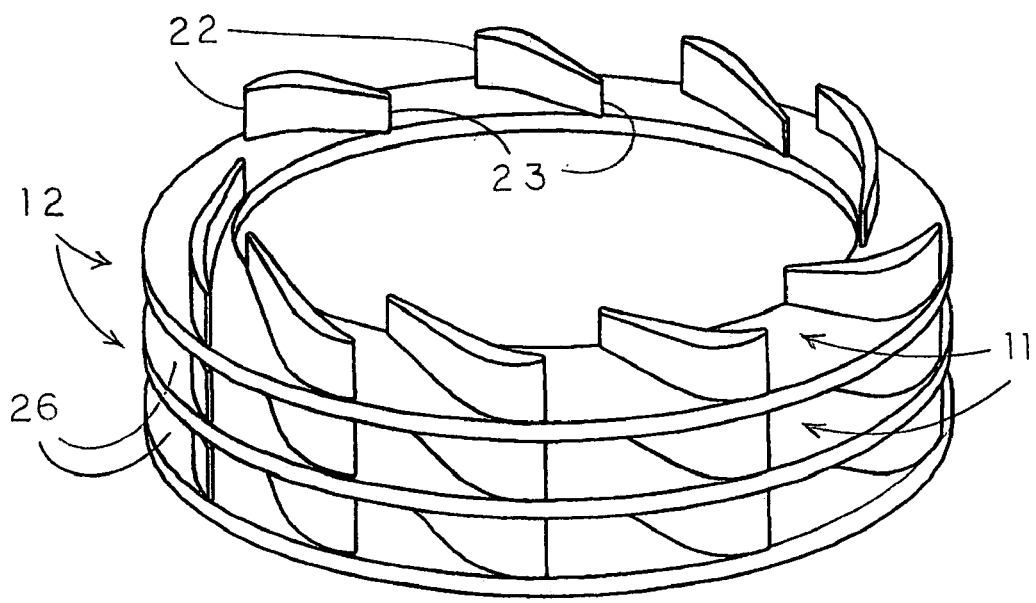
FIG. 14 is an isometric view of three nozzle rings stacked into one assembly.

FIG. 14 is an isometric view of three nozzle rings 12 stacked into an assembly forming a set of multiple nozzle rings. These rings may have the same pitch rating or have a completely different pitch rating for each ring. The orientation of the vanes 21 may also be the same or different for each nozzle ring 12 in the set.

A set of multiple nozzle rings may be individual nozzle rings that are stacked on top of each other, or the nozzle rings 12 may be formed or cast into one piece. This may aid in assembly of the turbine housing 15 or just for the simplicity of interchanging the multiple nozzle rings when desired.

Figure 15:
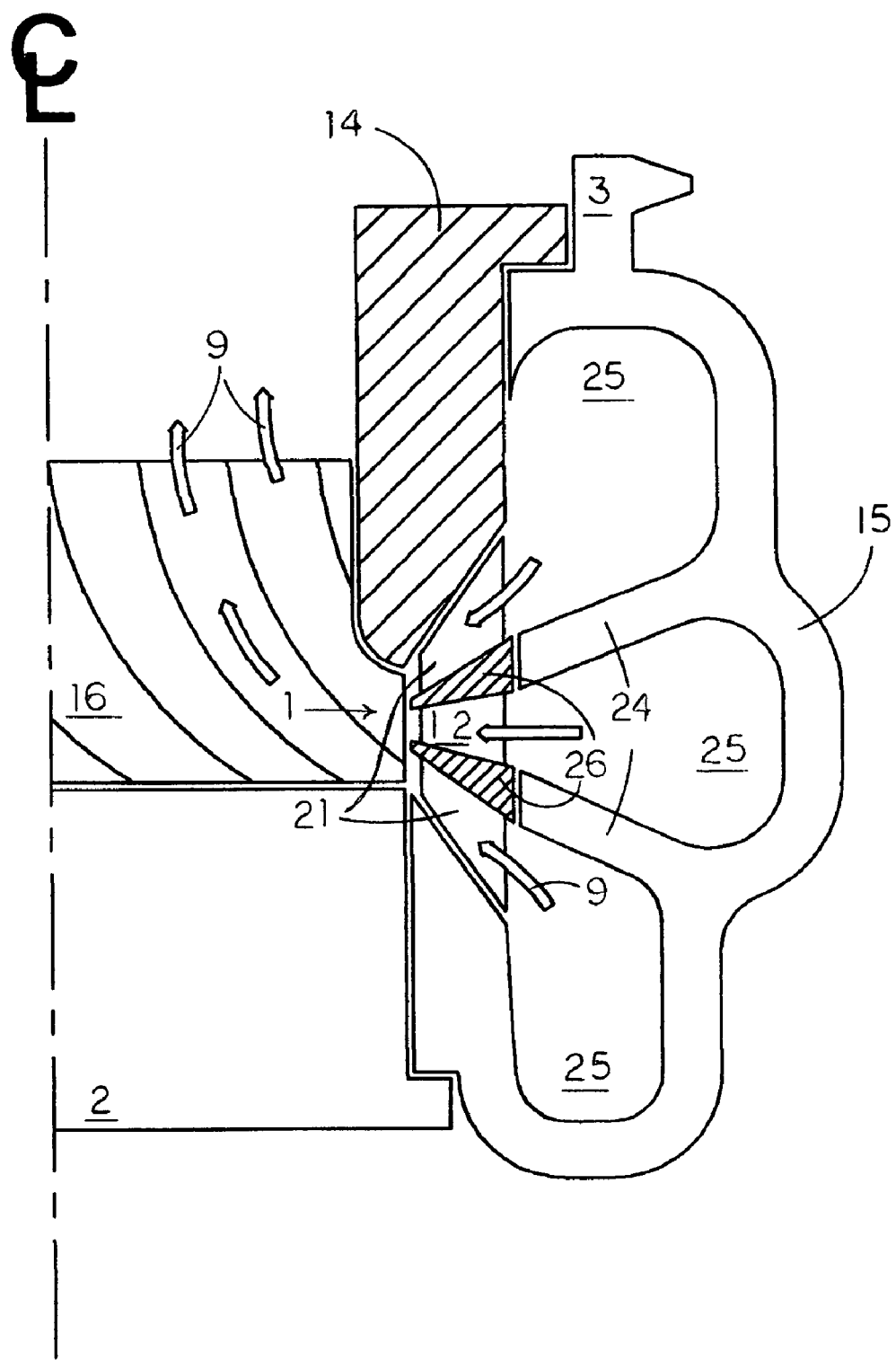
FIG. 15 is a partial cross-sectional view of a turbine housing in accordance with the present invention with three volutes and three sets of nozzle ring vanes.

FIG. 15 is a cross-sectional view of a partial turbine housing 15 with a set of multiple nozzle rings 12 positioned in the turbine housing 15 around the turbine wheel 16, and held in place by the retainer ring 14. This shows one method of making the multiple nozzle rings 12 in one assembly mounting the vanes 21 on each side of only two webs 26.

The exhaust gases 9 are expelled from each volute and forced through the nozzle rings 12 causing the turbine wheel 16 to rotate. In selected embodiments each volute gas chamber 25 may be suited to a specific task or engine workload by selecting the nozzle ring 12 with the required pitch for selected proficiency. This method of suiting each volute gas chamber to a specific task may develop maximum drive pressure against the turbine wheel 16 while maintaining minimum values of back pressure in the exhaust conduit 8.

Figure 16:
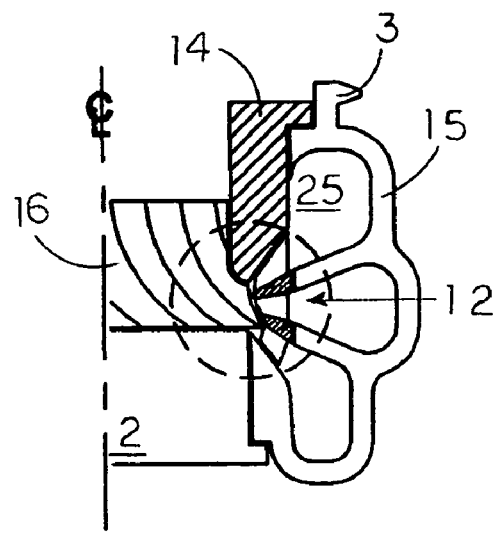
FIG. 16 is a partial cross-sectional view of a turbine housing with three volutes and three sets of nozzle rings in accordance with the present invention.

Referring to FIG. 16. This is a cross-sectional view of a partial turbine housing 15 enclosing three volute gas chambers 25 and fitted with three sets of nozzle ring vanes 21. The outside periphery of the turbine wheel 16 may be contoured for any purpose including to increase the drive pressure of the exhaust gases 9 against the turbine wheel 16, to increase the flow of exhaust gases 9, for ease of manufacture, or any reason to increase the proficiency of the turbocharger.

The vane leading edges 22 may be contoured to control the flow of exhaust gases 9 into the nozzle ring 12 or just to fit the shape of the volute gas chamber 25. The angle of the vane leading edge 22 may be contoured to accept the exhaust gases 9 in a manner to create better flow characteristics or to enhance performance. It is important to have an even distribution of the exhaust gases 9 throughout the entire nozzle ring 12.

The vane trailing edges 23 may also be contoured to increase the proficiency of the turbocharger. These reasons may include, to increase the impingement velocity of the exhaust gases 9, or to open the annular nozzle 1 to allow more exhaust gases to pass through, thus reducing the back pressure in the exhaust conduit 8.

The outer periphery of the turbine wheel 16 and the vane trailing edges 23 may be contoured to follow the same contour or each element may have a different contour. There is nothing restricting the contour of the turbine wheel 16, or the vane trailing edges 23 to follow the same contour. The turbine wheel 16 and the nozzle ring 12 may form its own separate contour or geometric shape.

Figure 17:
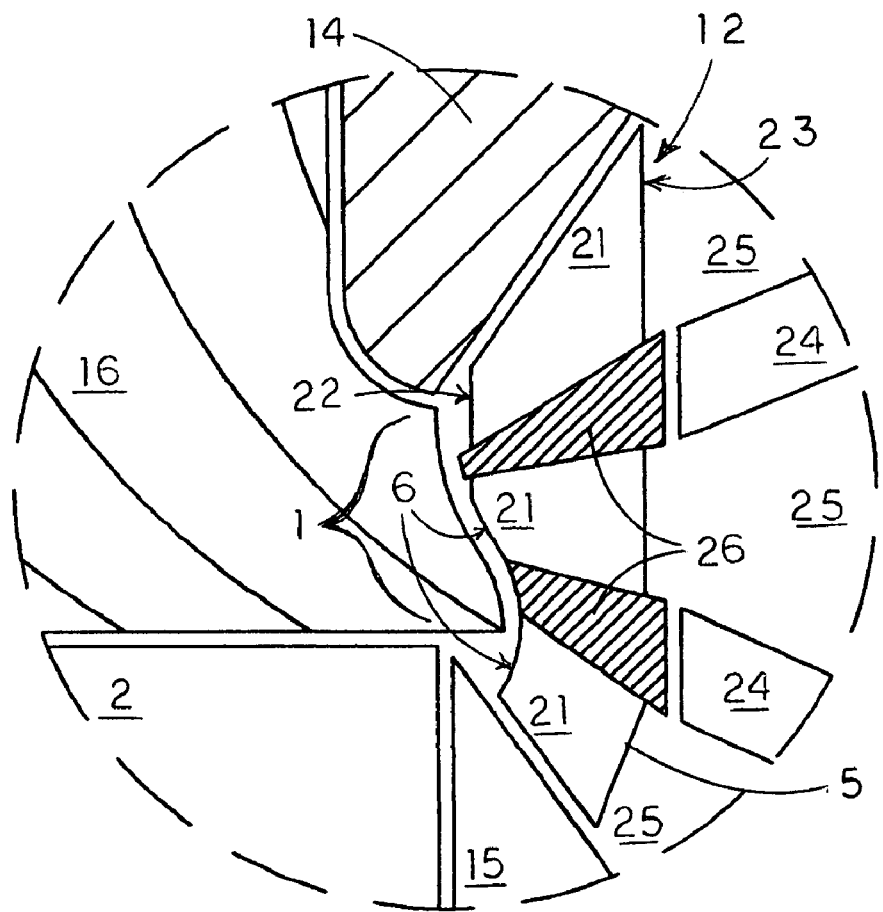
FIG. 17 is a close-up view of a section of the nozzle ring in FIG. 16.

FIG. 17 is a close-up view of the turbine wheel 16 and the nozzle ring 12 with contoured vane leading edges 22 and contoured vane trailing edges 23. Note how the web surface 27 is contoured to fit the shape of the turbine wheel 16.

Figure 18:
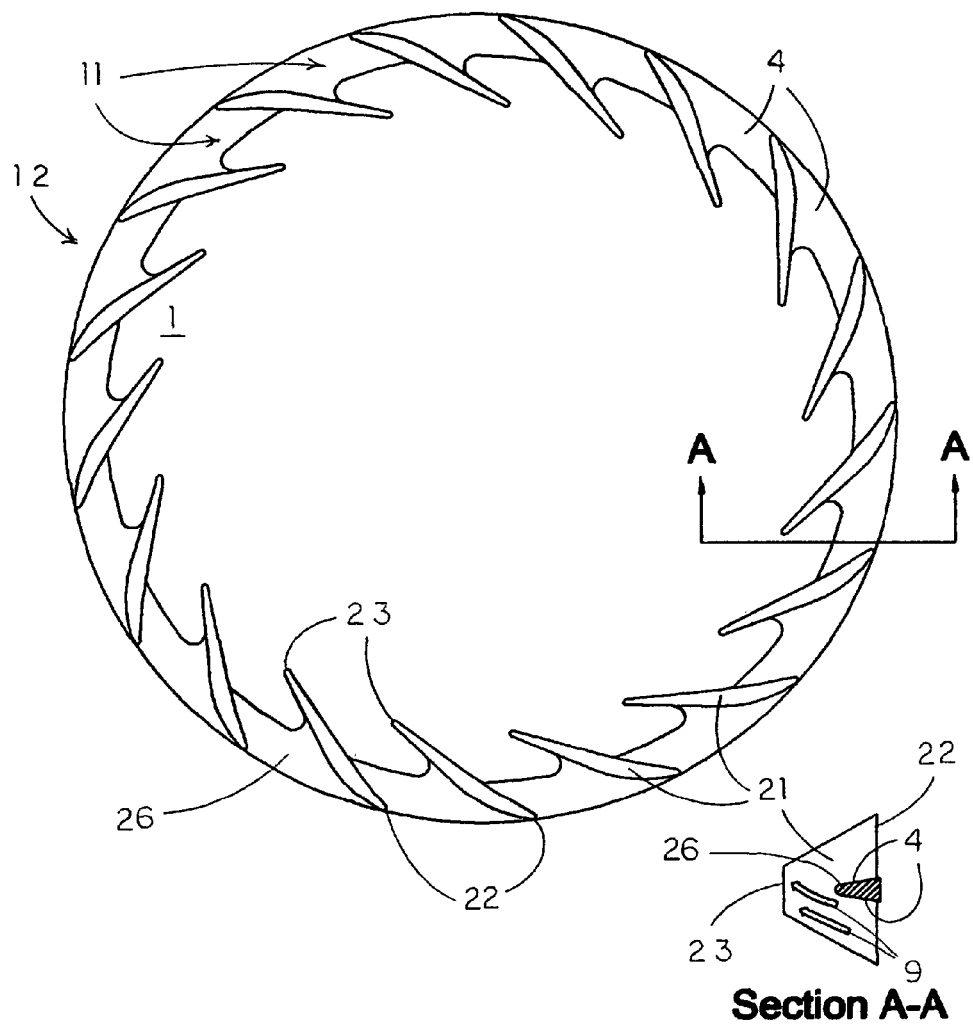
FIG. 18 is the top view of a nozzle ring in accordance with the present invention. Below is a cross-sectional view of the nozzle ring.

FIG. 18 is a top view of a nozzle ring 12 with a contoured web surface 27 and a cross-sectional view A-A of the nozzle ring 12.

In some embodiments the web surface 27 may be contoured to control the opening in the annular nozzle 1, to control the pitch angle 13, to enhance flow characteristics of exhaust gases 9, to create or maintain more drive pressure against the turbine wheel 16, or just to fit the shape of the turbine housing 15 or the shape of the gas volute chamber 25. The web surface 27 may be contoured with openings that are symmetrical or asymmetrical. The web 26 may divide the nozzle rings 12 into symmetrical configurations or asymmetrical configurations.

Figure 19:
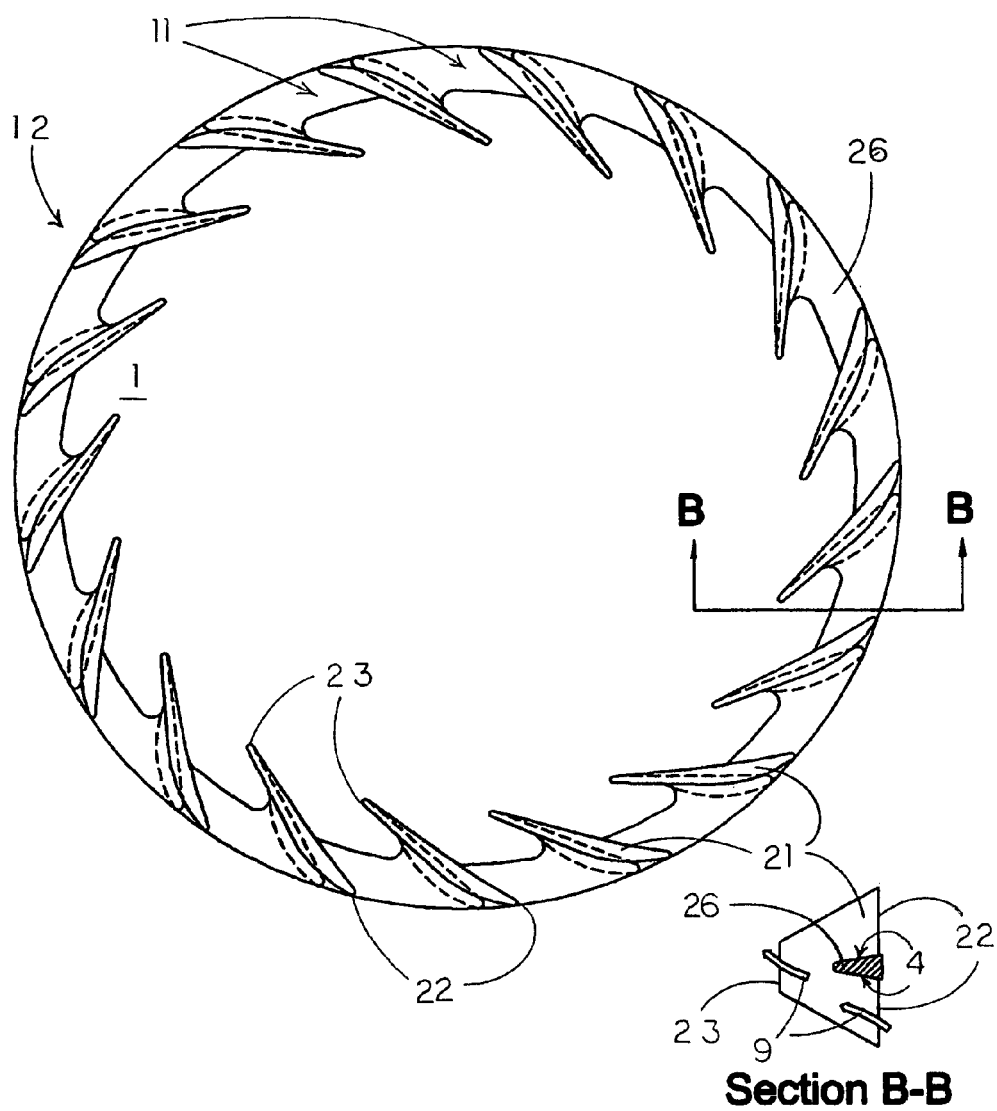
FIG. 19 is a top view of a set of nozzle rings with the vanes on the opposite side of the ring in dashed lines. Below is a cross-sectional view of the nozzle rings.

FIG. 19 is a top view of two nozzle rings 12 mounted on both sides of one web 26. Below is a cross-sectional B-B view of the above nozzle rings 12. The dashed lines illustrate the vanes 21 of the lower nozzle ring. In some embodiments it may be desirable to have a different pitch on two or more nozzle rings 12 that share the same vane trailing edges 23. This is illustrated by the difference in pitch on the vanes 21 of the upper nozzle ring 12 and the vanes 21 of the lower nozzle ring (shown by the dashed lines).

The openings in the web will create more drive pressure against the turbine wheel 16 as the exhaust gases 9 are allowed to flow from one volute gas chamber 25 to the vanes trailing edges 23 of both nozzle rings thus controlling the opening of the annular nozzle 1.

Figure 20:
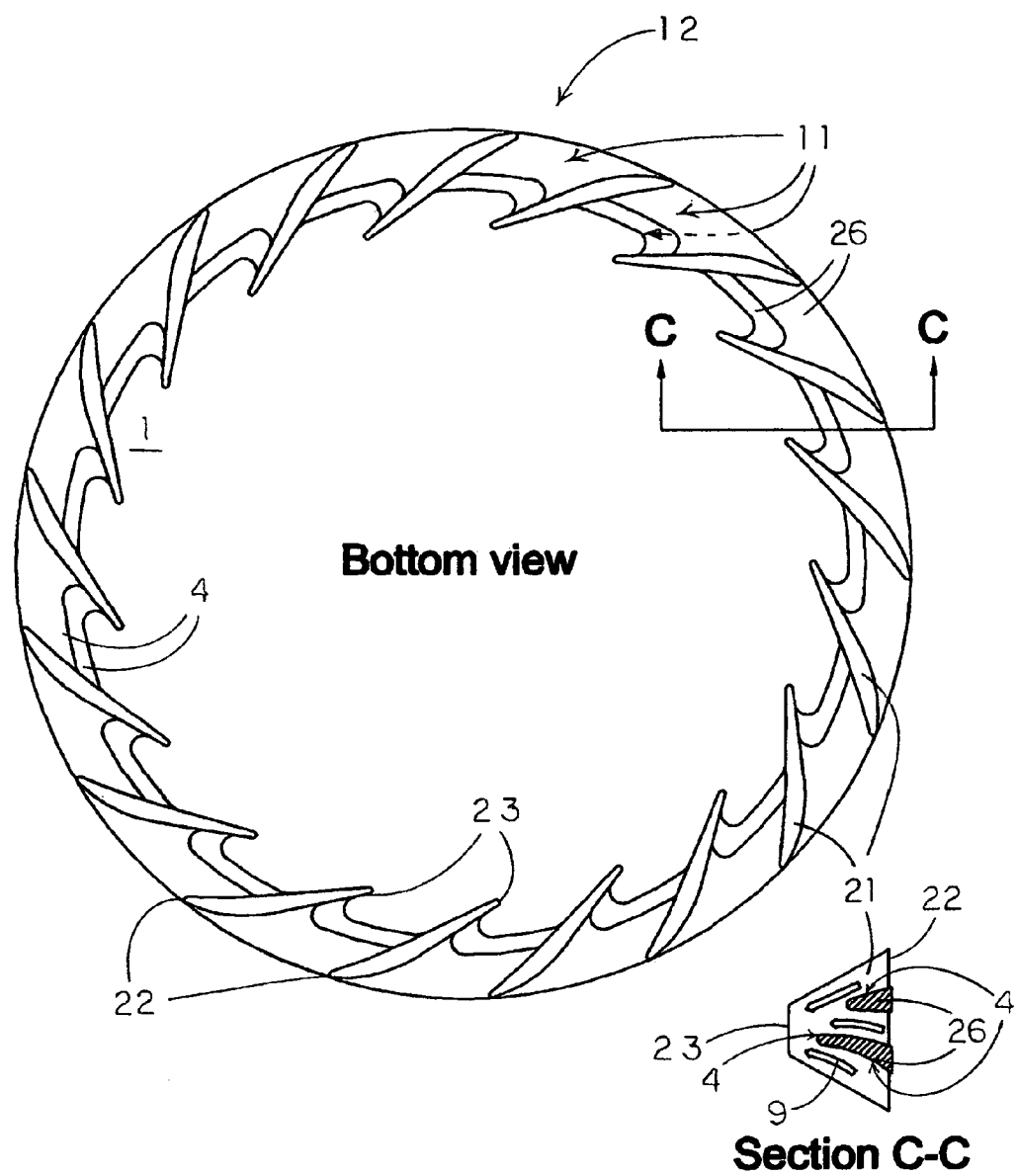
FIG. 20 is a bottom view of a set of three nozzle rings according to the present invention. The cross-sectional view below is of the same nozzle rings.

Referring to FIG. 20: This is a bottom view of three nozzle rings 12 assembled together to form a set of multiple nozzle rings. The cross-sectional view C-C below illustrates how the web surface 27 is contoured to enhance flow characteristics of the exhaust gases 9 from the volute gas chambers 25 and also to control the opening in the annular nozzle 1. As the exhaust gases 9 are forced into the entire opening of the annular nozzle 1, the exhaust gases 9 will impinge on the entire surface of the turbine wheel 16 and will increase the drive pressure against the turbine wheel 16. These openings in the annular nozzle 1 may be different on each nozzle ring 12; they may be equal or similar. The cross-sectional view C-C is the configuration used on our preferred embodiment.

Figure 21:
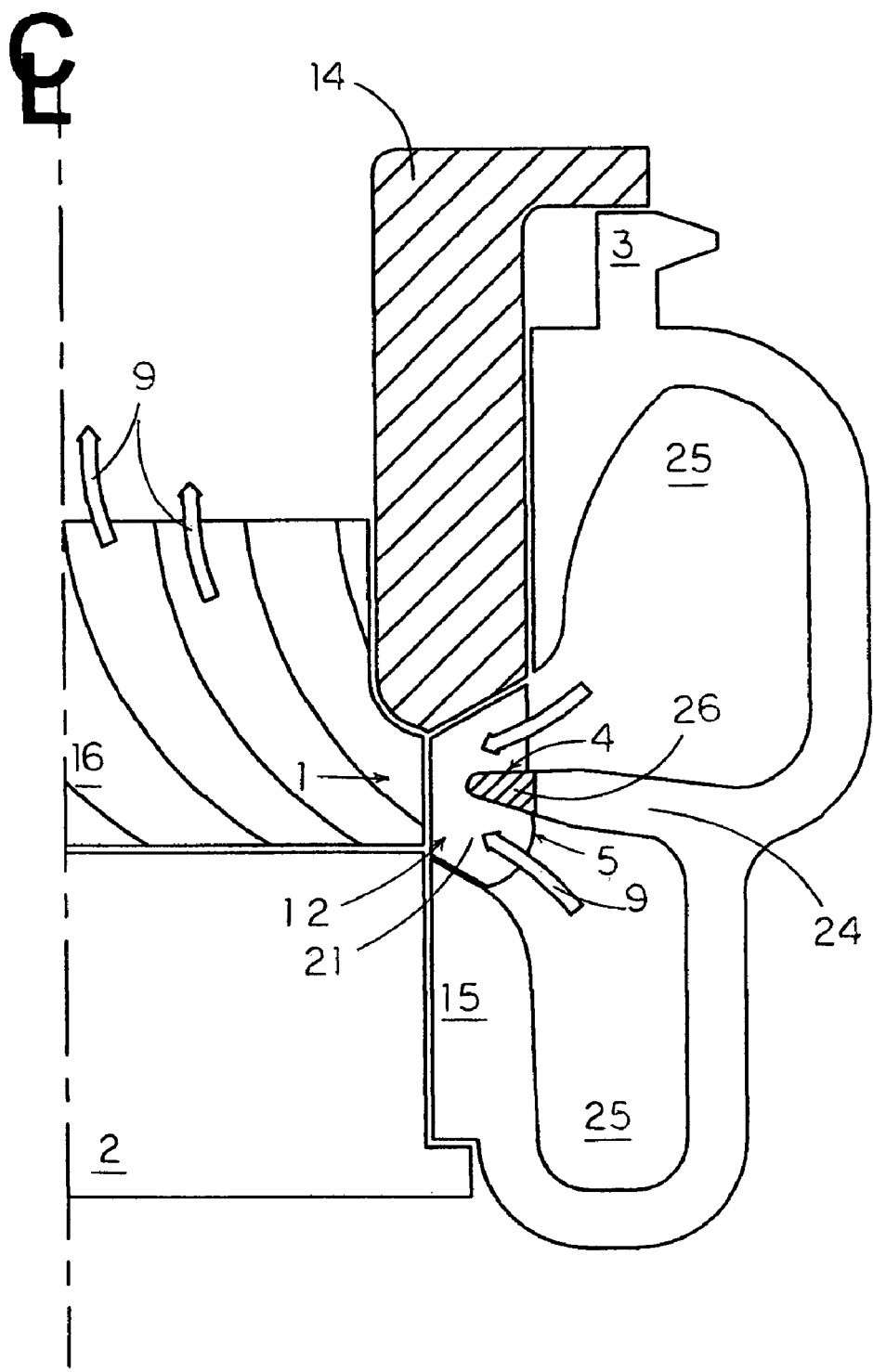
FIG. 21 is a partial cross-sectional view of a turbine housing in accordance with the present invention.

FIG. 21 is a cross-sectional view of a turbine housing 15 with a two nozzle rings 12 installed to form the annular nozzle of two asymmetrical volute gas chambers 25 in accordance with the present invention. Two sets of nozzle ring vanes 21 are mounted on opposite web surfaces 27 of the same web 27.

The exhaust gases 9 controlled by valve 17 are expelled from the volute gas chambers 25 and forced into the nozzle rings 12. The web surface is contoured to control the opening of the annular nozzle 1. The exhaust gases 9 from both volute gas chambers 25 may flow onto the entire outer periphery of the turbine wheel 16. In this and similar embodiments the exhaust gases 9 from either one or both volute gas chambers 25, may increase the drive pressure or control the impingement velocity to maximum proficiency by the contour of the web surface 27.

FIGS. 22-25 depict different configurations of multiple nozzle rings. These are all cross-sectional views with the centerline of the turbine wheel 16 to the left of each figure. It is important to note that the stacked nozzle rings do not have to necessarily come into contact with each other. Even though these drawings depict methods of stacking the nozzle rings against each other, the rings may be manufactured utilizing spacers between the nozzle rings or other mounting methods to hold one of more nozzle rings into the annular nozzle 1 of the turbine housing 15. These drawing do not show all of the methods of combinations possible. Any combination of webs 26, vanes 21, volute gas chambers 25, volute dividing walls 24, and other elements herein discussed, may be used that will maintain or increase the proficiency of the turbocharger. In some embodiments the web 26 may be extended to form one or more of the volute dividing walls 24, or part of the volute dividing wall 24. All of the above references to adjusting and contouring the vane leading edges 22, the vane trailing edges 23, and the web surfaces 27 apply to all of the figures in this document whether or not expressly illustrated or explained.

Figure 22:
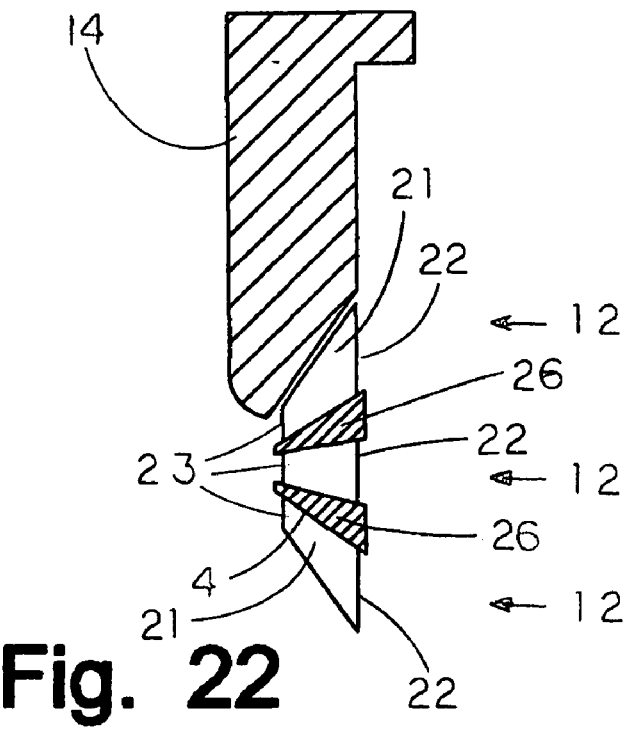
FIGS. 22 through 25 show various configurations and assemblies of multiple nozzle rings.

Referring to FIG. 22 in accordance with the present invention. This illustrates three sets of nozzle rings 12 formed together in one piece with the vanes 21 mounted on both sides of two webs 26 and held in a fixed position with one retaining ring 14.

Figure 23:
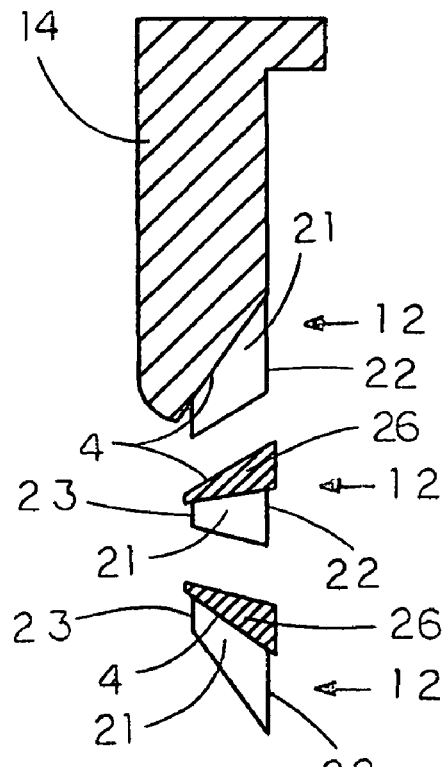

FIG. 23 is a cross-sectional view of three nozzle rings 12 with the vanes 21 mounted on separate webs 26. Note that one set of vanes 21 is mounted on the retainer ring 14 utilizing the retainer ring 14 as the web 26 and having a contoured web surface 27. The vanes 21 may be cast or formed onto any part of the turbine housing 15 or the volute dividing wall(s) 24. Also, in some embodiments the inside surface of the volute gas chamber may be contoured to form all or part of the contoured web surface 27 and may have the vanes 21 cast, formed, or mounted to the inside surface of the volute gas chamber 25.

Figure 24:
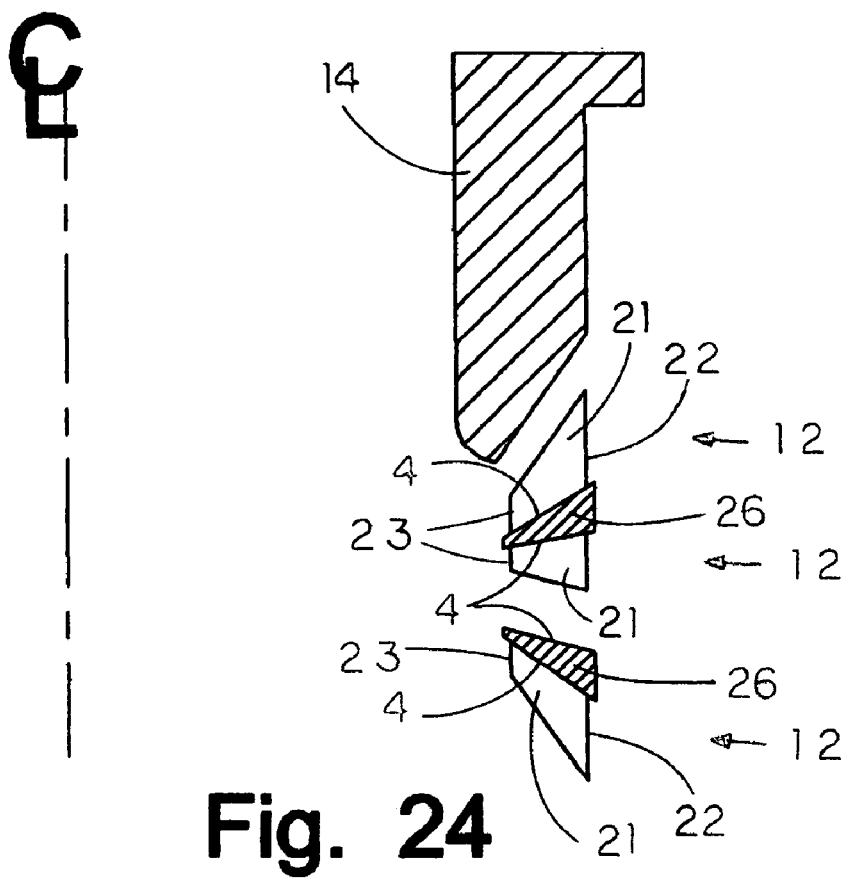

FIG. 24 in accordance with the present invention is a cross-sectional view showing two sets of vanes 21 mounted on both sides of one web 26 and one separate nozzle ring 12. Some embodiments may incorporate this configuration to adjust the first stage of the valve 17 and the turbine housing 15 by only changing one nozzle ring 12.

Figure 25:
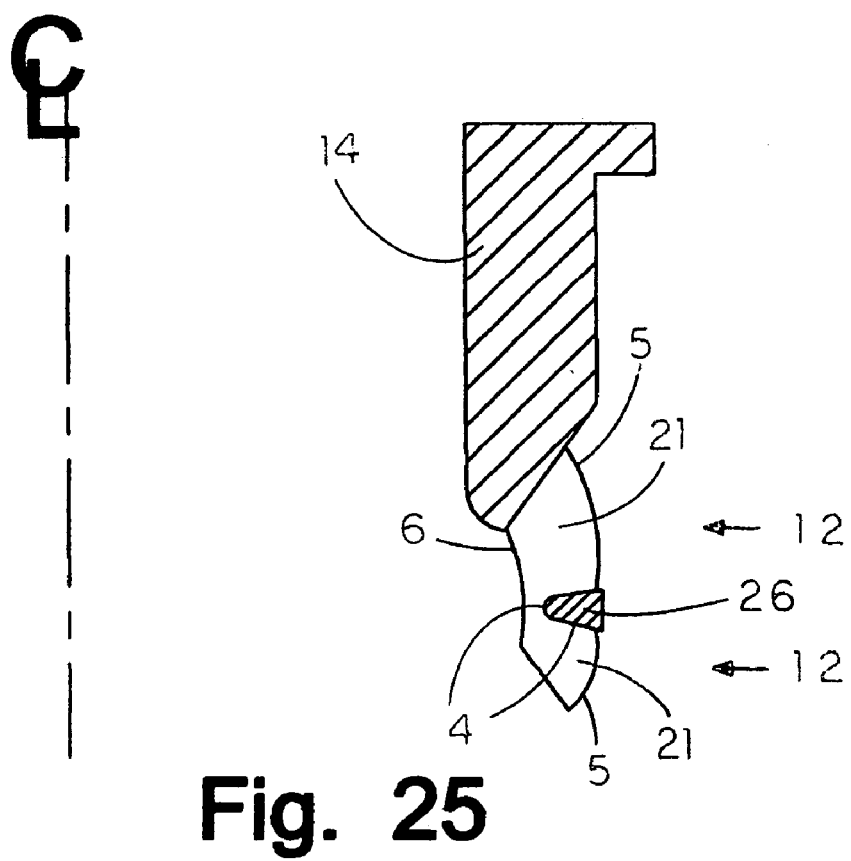

FIG. 25 is a cross-sectional view of a multiple nozzle ring assembly utilizing two nozzle rings 12 mounted on one web 26, the web surface 27 being contoured in both the annular nozzle and the channel between the vanes 21. The vane leading edges 22 and the vane trailing edges 23 have also been contoured for different proficiency requirements. In this configuration the two nozzle rings 12 may be formed or cast in one piece for ease of manufacture or ease of assembly.

Figure 26:
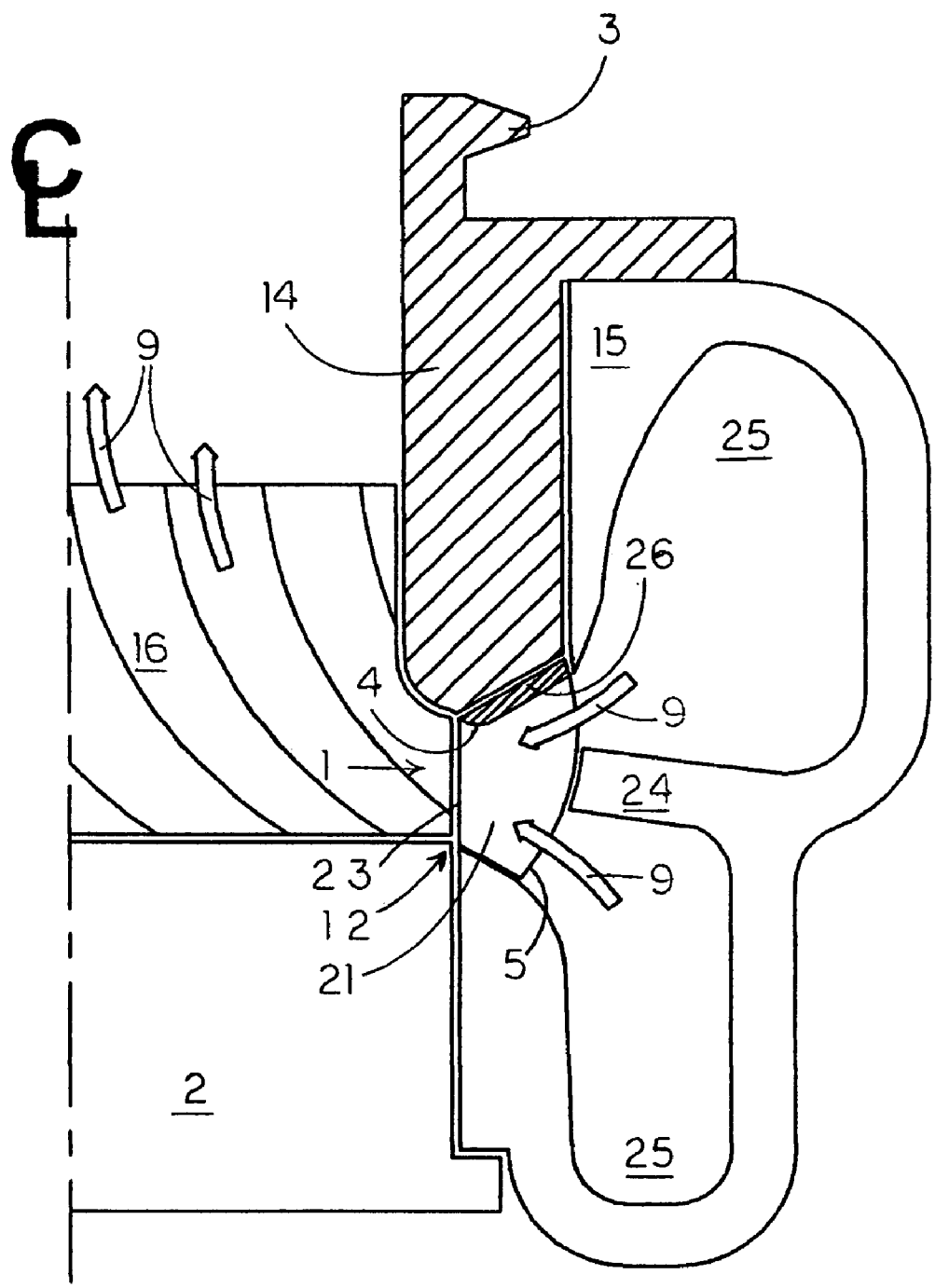
FIG. 26 is a partial cross-sectional view of a turbine housing in accordance with the present invention showing a single set of vanes forming the nozzle of two volutes.

FIG. 26 is a cross-sectional view of a partial turbine housing 15 in accordance with the present invention. One set of vanes 21 mounted to a web 26 forming one nozzle ring 12 is fixed over the opening of two volute gas chambers 25. This may ease the cost and manufacture of a single nozzle ring 12 verses the cost of a multiple nozzle ring assembly. In an embodiment similar to this, the exhaust gases 9 from each volute gas chamber 25 may still be controlled and directed against the turbine wheel 16 and may provide adequate impingement velocity and drive pressure to rotate the turbine wheel 16.

In some embodiments the retainer ring 14 may also be a piece of the turbine housing 15.

The nozzle rings 12 may be manufactured by forming or by casting. The materials may be heat resistant metal alloys, ceramic materials, or any substance that will maintain structural integrity while withstanding the heat of the exhaust gases 9 expelled from an internal combustion engine.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed as new and desired to be secured by United States Letters Patent is:

1. An exhaust-gas turbine assembly for use with a turbocharger, comprising:
   a turbine housing having an exhaust inlet side and an exhaust outlet side, the turbine housing receiving exhaust gases from an internal combustion engine through at least one exhaust gas inlet conduit on the exhaust inlet side of the housing;
   a plurality of nozzle rings, interchangeable with one another;
   one of the plurality of nozzle rings positioned in communication with at least one volute gas chamber encompassing the nozzle ring, the nozzle ring having a polar array of vanes extending therefrom, the vanes directing exhaust gases around or against a periphery of one or more turbine wheels to cause rotation of the one-or-more turbine wheels;
   a retainer ring, retaining the nozzle ring within the turbine housing;
   an exhaust gas outlet port positioned on the exhaust outlet side of the turbine housing, the exhaust gases passing through the exhaust gas outlet after passing around or against the periphery of the one or more turbine wheels; and
   the nozzle ring and the retainer ring being installable and removable through the exhaust gas outlet port on the exhaust outlet side of the turbine housing.

2. The assembly of claim 1, further comprising a plurality of nozzle rings positioned adjacent one another and retained by the retainer ring.

3. The assembly of claim 2, wherein at least one of the plurality of nozzle rings includes a central web having vanes extending from opposite sides of the central web.

4. The assembly of claim 2, wherein at least two of the nozzle rings have different operating characteristics.

5. The assembly of claim 1, wherein the vanes include contoured leading edges.

6. The assembly of claim 1, wherein the vanes include contoured trailing edges.

7. The assembly of claim 1, wherein the nozzle ring and the retainer ring are installable in and removable from the turbine housing while the turbine housing remains installed on a vehicle.

8. A tunable exhaust-gas turbine assembly for use with a turbocharger, comprising:
   a turbine housing having an exhaust inlet side and an exhaust outlet side, the turbine housing receiving exhaust gases from an internal combustion engine through at least one exhaust gas inlet conduit on the exhaust inlet side of the housing;
   a plurality of nozzle rings, interchangeable with one another:
   one of the plurality of nozzle rings positioned in communication with at least one volute gas chamber encompassing the at least one nozzle ring, the nozzle ring having a polar array of vanes extending therefrom, the vanes directing exhaust gases around or against a periphery of one or more turbine wheels to cause rotation of the one-or-more turbine wheels;
   a retainer ring, retaining the nozzle ring within the turbine housing;
   an exhaust gas outlet port positioned on the exhaust outlet side of the turbine housing, the exhaust gases passing through the exhaust gas outlet after passing around or against the periphery of the one or more turbine wheels; and
   wherein performance characteristics of the turbocharger can be tuned while the turbocharger remains installed on a vehicle by selectively replacing the nozzle ring with a nozzle ring having different performance characteristics.

9. The assembly of claim 8, further comprising a plurality of nozzle rings positioned adjacent one another and retained by the retainer ring.

10. The assembly of claim 9, further comprising at least three nozzle rings positioned adjacent one another and retained by the retainer ring.

11. The assembly of claim 9, wherein at least one of the plurality of nozzle rings includes a central web having vanes extending from opposite sides of the central web.

12. The assembly of claim 11, wherein the central web is contoured to promote smooth flow characteristics of exhaust gases over or past the central web.

13. The assembly of claim 8, wherein the vanes include contoured leading edges.

14. The assembly of claim 8, wherein the vanes include contoured trailing edges.

15. The assembly of claim 8, wherein the nozzle ring and the retainer ring are installable in and removable from the turbine housing while the turbine housing remains installed on a vehicle.

16. An exhaust-gas turbine assembly for use with a turbocharger, comprising:
   a turbine housing having an inlet side and an outlet side, the turbine housing receiving exhaust gases from an internal combustion engine through at least one exhaust gas inlet conduit on the inlet side of the housing;
   a plurality of nozzle rings, interchangeable with one another;
   at least three of the interchangeable nozzle rings positioned adjacent one another and in communication with at least three volute gas chambers encompassing the at least three nozzle rings, the nozzle rings each having a polar array of vanes extending therefrom, the vanes directing exhaust gases around a periphery of one or more turbine wheels to cause rotation of the one-or-more turbine wheels;
   a retainer ring, retaining the at least three nozzle rings within the turbine housing; and an exhaust gas outlet port positioned on the exhaust outlet side of the turbine housing, the exhaust gases passing through the exhaust gas outlet after passing around or against the periphery of the one or more turbine wheels.

17. The assembly of claim 16, wherein the at least three nozzle rings and the retainer ring are installable in and removable from the turbine housing through the exhaust gas outlet port.

18. The assembly of claim 16, wherein at least one of the at least three nozzle rings includes a central web having vanes extending from opposite sides of the central web.

* * * * *